(12) United States Patent
Simpson et al.

(10) Patent No.: US 8,448,685 B2
(45) Date of Patent: May 28, 2013

(54) BONDING CARBON-CARBON COMPOSITES THROUGH A REACTANT LAYER

(75) Inventors: Allen H. Simpson, Buchanan, MI (US);
Slawomir T. Fryska, Granger, IN (US);
Mark L. La Forest, Granger, IN (US);
Roger L. Klinedinst, North Liberty, IN (US); Alexander Mukasyan, Granger, IN (US); Charles D. D'Amico, Osceola, IN (US)

(73) Assignees: Honeywell International Inc., Morristown, NJ (US); University of Notre Dame du Lac, Notre Dame, IN (US)

( * ) Notice: Subject to any disclaimer, the term of this patent is extended or adjusted under 35 U.S.C. 154(b) by 67 days.

(21) Appl. No.: 13/038,953

(22) Filed: Mar. 2, 2011

(65) Prior Publication Data

US 2011/0155323 A1   Jun. 30, 2011

Related U.S. Application Data

(62) Division of application No. 11/392,341, filed on Mar. 29, 2006, now Pat. No. 7,922,845.

(51) Int. Cl.
*B29C 65/32* (2006.01)
*B32B 37/06* (2006.01)
*B32B 41/00* (2006.01)
*B32B 43/00* (2006.01)
*B30B 15/34* (2006.01)

(52) U.S. Cl.
USPC .................. 156/379.7; 156/380.4; 156/380.6; 156/583.2

(58) Field of Classification Search
USPC ............. 156/89.12, 89.16, 89.25, 89.26, 235, 156/241, 272.2, 273.7, 274.4, 379.6, 379.7, 156/380.2, 380.3, 380.4, 380.6, 580, 583.1, 156/583.2
See application file for complete search history.

(56) References Cited

U.S. PATENT DOCUMENTS

| | | | |
|---|---|---|---|
| 2,979,813 A | | 4/1961 | Steinberg |
| 3,101,403 A | | 8/1963 | Lewis et al. |
| 3,742,599 A | * | 7/1973 | Desmond et al. ............... 29/856 |
| 3,895,084 A | | 7/1975 | Bauer |
| 3,916,766 A | * | 11/1975 | Huelskamp ..................... 91/519 |

(Continued)

FOREIGN PATENT DOCUMENTS

| DE | 19734211 A1 | 2/1999 |
|---|---|---|
| EP | 0346821 A1 | 12/1989 |

(Continued)

OTHER PUBLICATIONS

Communication from corresponding EP Application No. 07 759 459, 4 pages, dated Apr. 29, 2010.

(Continued)

*Primary Examiner* — Sing P Chan
(74) *Attorney, Agent, or Firm* — Shumaker & Sieffert, P.A.

(57) ABSTRACT

An apparatus for bonding a first carbon composite to a second carbon composite through a reactant layer includes a housing, and a pair of conductive press plates electrically isolated from the housing. The press plates are adapted to position the two parts to be bonded with a reactant layer therebetween. The press plates are subjected to an electrical potential and a clamping force, sufficient to initiate a combustion reaction that creates a molten ceramic to bond together the carbon-carbon composites.

18 Claims, 6 Drawing Sheets

U.S. PATENT DOCUMENTS

| | | | |
|---|---|---|---|
| 4,514,240 | A | 4/1985 | Heraud |
| 4,721,840 | A | 1/1988 | Fielding |
| 4,742,948 | A | 5/1988 | Fisher et al. |
| 5,021,107 | A | 6/1991 | Holko |
| 5,139,594 | A | 8/1992 | Rabin |
| 5,299,667 | A | 4/1994 | Hammond |
| 5,340,014 | A | 8/1994 | Sekhar et al. |
| 5,382,769 | A | 1/1995 | Jensen |
| 5,471,028 | A | 11/1995 | Kawai |
| 5,483,035 | A | 1/1996 | Kawai et al. |
| 5,587,091 | A | 12/1996 | Kawagoe et al. |
| 5,972,157 | A | 10/1999 | Xue et al. |
| 6,174,605 | B1 | 1/2001 | Xue et al. |
| 6,699,427 | B2 | 3/2004 | Huang et al. |
| 6,878,331 | B2 | 4/2005 | Huang et al. |
| 7,858,187 | B2 | 12/2010 | Simpson et al. |
| 2003/0178468 | A1 | 9/2003 | Lee et al. |
| 2004/0066610 | A1 | 4/2004 | Miyachi et al. |
| 2007/0235123 | A1 | 10/2007 | Simpson et al. |
| 2007/0235126 | A1 | 10/2007 | Simpson et al. |

FOREIGN PATENT DOCUMENTS

| | | |
|---|---|---|
| GB | 2095150 | 9/1982 |
| GB | 2167821 | 6/1986 |
| GB | 504078 | 3/2011 |
| JP | 248473 | 2/1990 |

OTHER PUBLICATIONS

Communication from corresponding EP Application No. 07 759 459, 4 pages dated Aug. 6, 2009.
Response to EP Communication from corresponding EP Application No. 07 759 459, 4 pages, dated Dec. 11, 2009.
Response to EP Communication from corresponding EP Application No. 07 759 459, 4 pages, dated Aug. 19, 2010.
Office Action dated Jun. 24, 2009 for U.S. Appl. No. 11/391,255 (7 pages).
Responsive Amendment dated Jul. 17, 2009 for U.S. Appl. No. 11/391,255 (6 pages).
Office Action dated Oct. 19, 2009 for U.S. Appl. No. 11/391,255 (7 pages).
Responsive Amendment dated Jan. 19, 2010 for U.S. Appl. No. 11/391,255 (8 pages).
Office Action dated Apr. 16, 2010 for U.S. Appl. No. 11/391,255 (9 pages).
Responsive Amendment dated Jul. 16, 2010 for U.S. Appl. No. 11/391,255 (6 pages).
Examination Report from corresponding EP Application No. 11176654.9, mailed Sep. 27, 2011, 6 pages.
European Search Report from corresponding EP Application No. 11176654.9, mailed Sep. 15, 2011, 4 pages.
Reply to communication from the Examining Division, for EP Application No. 11176654.9, dated Jan. 26, 2012, 30 pages.
Examination Report from counterpart EP Application No. 11 176 654.9 mailed Nov. 14, 2012, 4 pages.
Jeremiah D. White et al., "Novel Apparatus for Joining of Carbon-Carbon Composites," Review of Scientific Instruments, AIP, Melville, NY, US, vol. 78, Jan. 11, 2007.
International Preliminary Report on Patentability from corresponding PCT Application No. PCT/US2007/065013, 7 pages, mailed Oct. 9, 2008.
International Search Report from corresponding PCT Application No. PCT/US2007/065013, 14 pages, mailed Aug. 6, 2007.

* cited by examiner

BONDING CARBON-CARBON COMPOSITES THROUGH A REACTANT LAYER

This application is a divisional of U.S. patent application Ser. No. 11/392,341, filed Mar. 29, 2006, which issued as U.S. Pat. No. 7,922,845 on Apr. 12, 2011. This application may be found related to U.S. Pat. No. 7,858,187, which issued on Dec. 28, 2010. The entire content of both these applications is incorporated herein by reference.

TECHNICAL FIELD

This disclosure relates generally to the manufacturing of carbon-carbon composites, such as carbon brake discs.

BACKGROUND

Carbon-carbon brake discs are widely used on commercial and military aircraft. Wide-bodied commercial jets required improved brake materials because traditional steel brake systems simply could not absorb all of the thermal energy created during stops associated with landings. Carbon-based composites were developed which provide heat capacity, thermal conductivity, and thermal strength able to meet the demanding conditions involved in landing large commercial jets. On the military side, the lower weights as well as the thermal and strength properties of the carbon composites has helped to ensure their acceptance in brake applications.

The use of carbon-carbon composite brake discs in aircraft brakes, which have been referred to as carbon brakes, is well known in the aerospace industry. Carbon-carbon composite brake discs are manufactured by aircraft wheel and brake manufacturers using a variety of manufacturing methods, which generally require lengthy fabrication and densification methods. In recent years, aircraft manufacturers have increasingly specified the use of such carbon-carbon composite brake discs for brakes designed for use with new aircraft models. In some instances, for example in the reuse of worn carbon-carbon composite discs, it is desirable to combine or attach two or more carbon-carbon friction materials together. Typically, this is accomplished through mechanical fasteners, such as, for example, through the use of rivets.

In at least one instance, the carbon-carbon composites are alternatively held together through the use of a spot-applied molten braze material such as a Zirconium metal. To accomplish this, the carbon composites are subjected to an electrical current such that the resistance in the carbon material causes a temperature increase. A thin layer of braze material, such as a thin metal foil, is melted in the general area of the applied current. The metal melts, and after removal from the electrical current, solidifies again to locally bond the carbon-carbon composites. The finished brazed material, however, is subject to failure at a relatively low temperature, as the metal material need only melt to release the bond. Additionally, the composites are subject to oxidation, as the metal utilized is typically very reactive.

Accordingly, it may be desirable to provide an apparatus capable of bonding carbon-based composites without the need for mechanical fasteners, and without use of a molten metal material.

DETAILED DESCRIPTION

The following description of the disclosed embodiment is not intended to limit the scope of the invention to the precise form or forms detailed herein. Instead the following description is intended to be illustrative of the principles of the invention so that others may follow its teachings.

Figure 1:
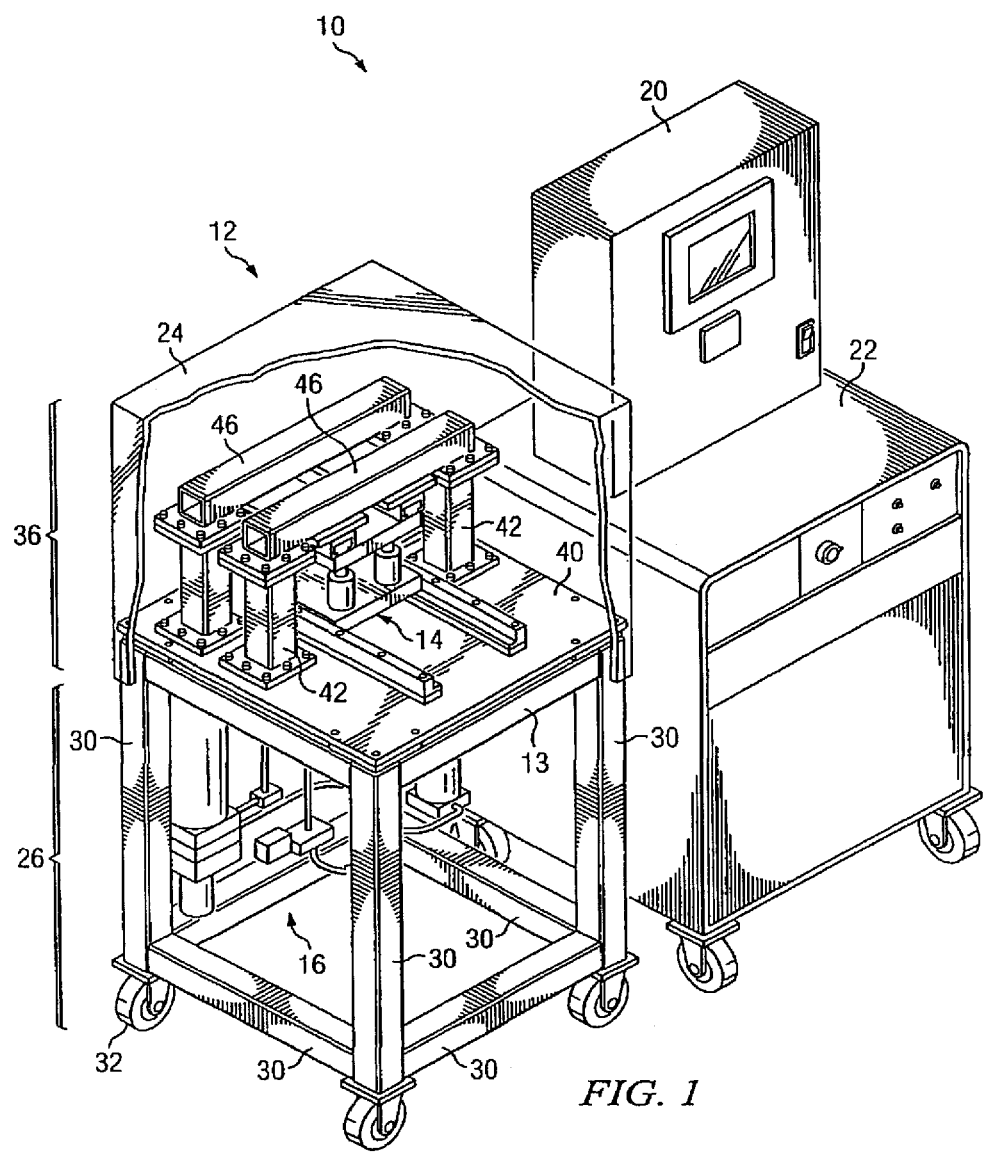
FIG. 1 is a front perspective view of an example apparatus for bonding carbon-based composites through a reactant layer.

Referring now to the drawings, FIG. 1 is an illustration of an example apparatus, such as a press 10, for bonding two carbon-based composites. The exemplary press 10 includes a housing 12, which in this embodiment generally includes a support frame 13, a press die assembly 14, a clamping device 16, and a protective guard 24. Additionally, the press 10 may include a controller 20, and a power supply 22. While the structure of the press 10 will be described, for ease of understanding, in conjunction with a plurality of separate components, it will be understood by one of ordinary skill in the art that the components may be combined or separated in various combinations.

In this example, a lower portion 26 of the support frame 13 may include a plurality of heavy square tube frame segments 30 forming a generally rectangular support structure. The support frame 13 may be mounted on or otherwise coupled to a suitable transportation device such as, for example, a plurality of lockable casters 32 which may have step-on pads (not shown) to selectively hold the casters 32 stationary as desired. An upper portion 36 of the support structure 13 may include a top plate 40, which in this example is horizontally supported by the lower portion 26 of the support frame 13. Coupled to the top plate 40 is support structure, such as, for example, a plurality of vertically extending heavy square tube frame segments 42. In this example, the frame segments 42 support a plurality of transverse support beams 46, to form a top crown weldment 43 adapted to support the press die assembly 14, one example of which is disclosed in further detail below. Optionally, the support frame 13 may be at least partially surrounded by the protective guard 24, which in this embodiment surrounds the upper portion 36 of the support structure 13 and is constructed of a durable material, such as, for example a plurality of shatter resistant MAKROLON® (polyacrylic) panels.

Figure 2:
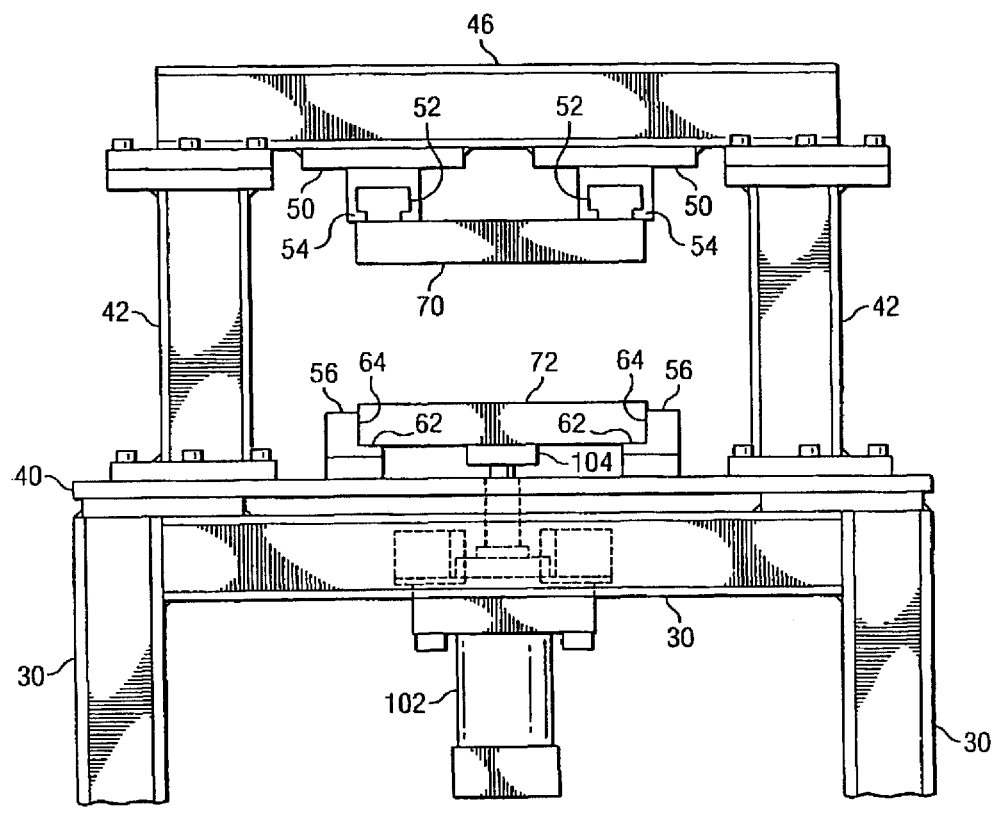
FIG. 2 is a front elevational view of the example apparatus of FIG. 1.
Figure 3:
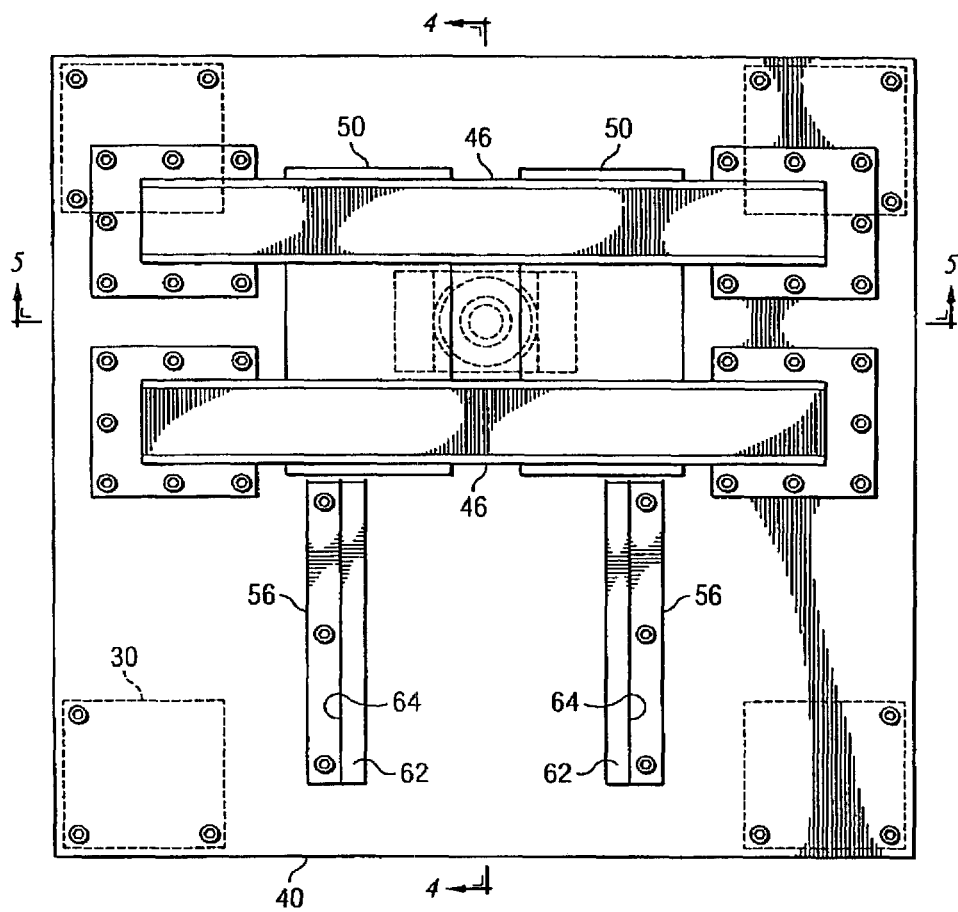
FIG. 3 is a plan view of the example apparatus of FIG. 1.

Referring to FIGS. 2 and 3, the weldment 43 may include a plurality of rails 50, which may assist in the loading and unloading of the press die assembly 14 by slidably receiving the press die assembly 14. For example, the rails 50 may include a pair of U-shaped channel rails 52, each having at least one lip extension 54 adapted to receive a corresponding top edge of the die assembly 14. To further assist in the loading and unloading of the press die assembly 14, a plurality of corresponding rails 56 are mounted opposite the rails 50. In this example, the rails 56 include a pair of L-shaped rails, each having at least one sliding surface 62 and at least one guiding surface 64. In other words, the press die assembly 14 is shiftable between an unloaded position, for example, a position wherein the press die assembly 14 may be removed or otherwise disassembled, and a loaded position, for example, an operative position wherein the press die assembly 14 is ready for processing. A limit switch (not shown) may be utilized to ensure the press die assembly 14 is properly seated in the operating or loaded position. It will be appreciated by one of ordinary skill in the art that the rails 50 and 60 may be any device suitable for shifting the die assembly 14 between the loaded and unloaded positions, such as for instance, rollers, ball bearings, or any other suitable device.

Figure 4:
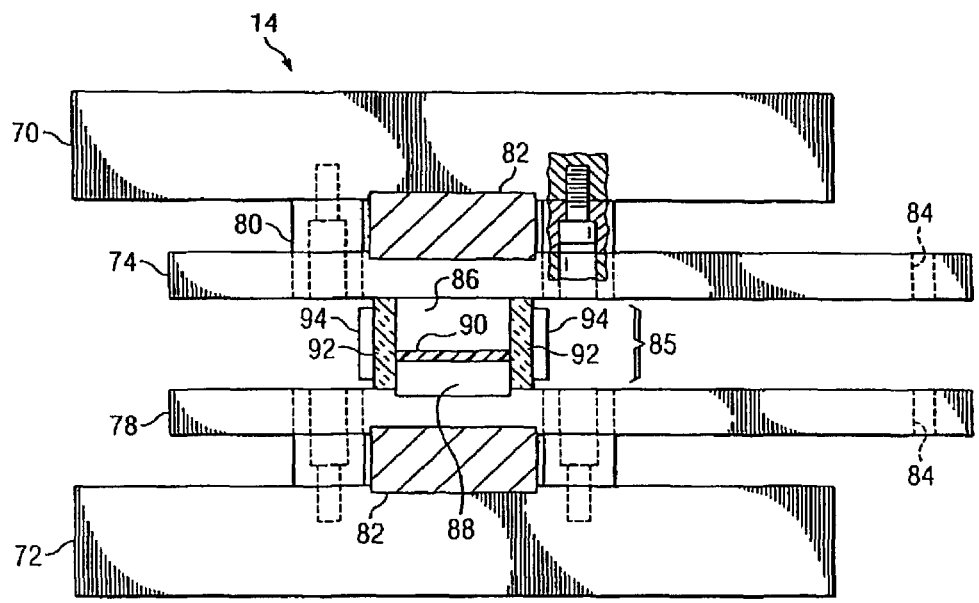
FIG. 4 is a cross-sectional view of a press die assembly of the apparatus of FIG. 1, taken along the line 4-4 of FIG. 3.
Figure 5:
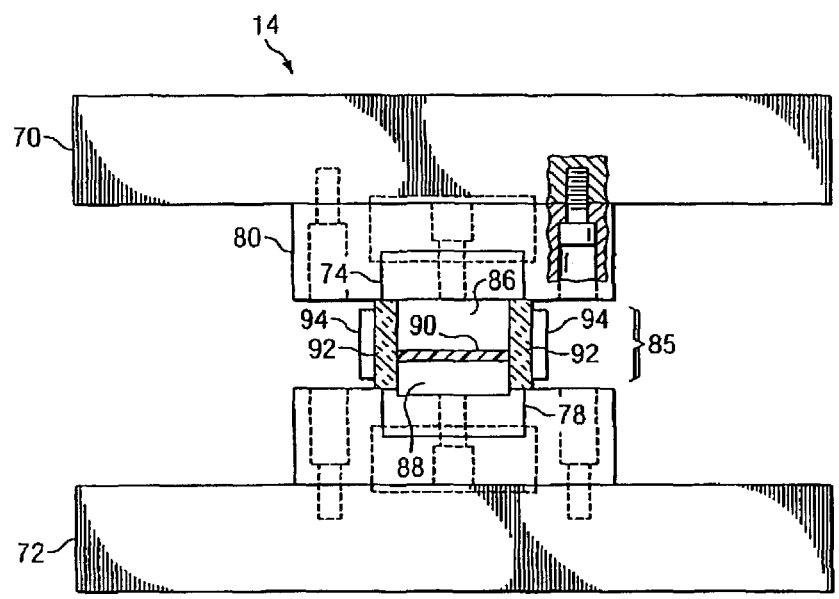
FIG. 5 is a cross-sectional view of the press die assembly of the apparatus of FIG. 1, taken along the line 5-5 of FIG. 3.

FIGS. 4 and 5 illustrate the press die assembly 14 in the loaded or operable position. As shown, the press die assembly 14 includes a first die base 70 and a second die base 72. In this example, the first die base 70 is adapted to be slidably coupled to the channel rails 52 (see FIG. 2). Similarly, the second die base 72 is adapted to slidably couple to the rails 56. Mounted to each of the first and second die bases 70, 72, respectively, is a first conductive press plate 74 and a second conductive press plate 78, each of which may be, for example, formed from a copper alloy. As illustrated, each of the press plates 74, 78 is electrically isolated from its corresponding die base 70, 72, and accordingly, from the housing 12. For example, to electrically isolate the press plates 74, 78, from the die bases 70, 72, the press plates 74, 78 may be mounted to the die bases 70, 72 with at least one high current power supply insulator 80, such as, for example, an electrical grade polytetrafluoroethylene (PTFE). Additionally, to further assist in the electrical isolation of the press plates 74, 78, a dielectric material 82, such as, for example zirconium phosphate, may be mounted between the die bases 70, 72 and the press plates 74, 78. It will be appreciated that in the illustrated example, the dielectric material 82 may be any suitable dielectric, including, for example, zirconium phosphate as disclosed.

Each press plate 74, 78 is electrically coupled to the power supply 22 such that the power supply 22 creates an electric potential across the plates 74, 78, and therefore the carbon composite parts. In this example, each press plate includes at least one aperture 84 to securely couple the plate with the power supply 22 through suitable flexible wiring (not shown). In one embodiment, the power supply 22 provides a high voltage, direct current (DC), but it will be appreciated that any suitable power supply may be utilized, including alternating circuit (AC).

To bond at least two carbon-based composites, such as, for example, carbon-carbon composites, the press plates 74, 78 are adapted to hold a mold, such as a carbon-carbon assembly 85 therebetween. For instance, in operation, the two press plates 74, 78 are adapted to support the carbon-carbon assembly 85 including a first carbon-carbon composite disc 86 and a second carbon-carbon composite disc 88, such as, for example carbon discs suitable for use in an aircraft braking mechanism. The discs 86, 88 have a reactant layer 90 placed between the two discs on at least a portion of the surface of the discs 86, 88 intended to be bonded. The reactant layer 90 may be any suitable bonding layer, such as, for instance, a carbide forming metal optionally mixed with carbon powder such as titanium and carbon. Additionally, to assist in heat retention, the carbon-carbon assembly 85 may optionally include a thermal insulator 92 surrounding at least a portion of the carbon-carbon assembly 85. Still further, at least a portion of the carbon-carbon assembly 85 may optionally be enclosed in a retaining band 94 which in this illustration surrounds at least a portion of the thermal insulator 92, but may alternatively surround at least a portion of the discs 86, 88, or the reactant layer 90. The retaining band 94 may provide additional support and safety due to the elevated amount of heat and pressure required to initiate the combustion synthesis of the two discs 88, 90. A thermocouple (not shown) may be optionally placed proximate the reactant layer 90 to monitor the temperature during any part of the manufacturing cycle. For example, the thermocouple (not shown) may be operatively coupled near the reactant layer 90 by being imbedded in the retaining band 94 and/or the thermal insulator 92, or may be located at any suitable location so that the temperature of the area proximate the reactant layer 90 may be monitored, analyzed, and/or otherwise recorded. Additionally, the thermocouple may be operatively coupled to the controller 20, wherein the temperature may be further analyzed and/or processed.

Figure 6:
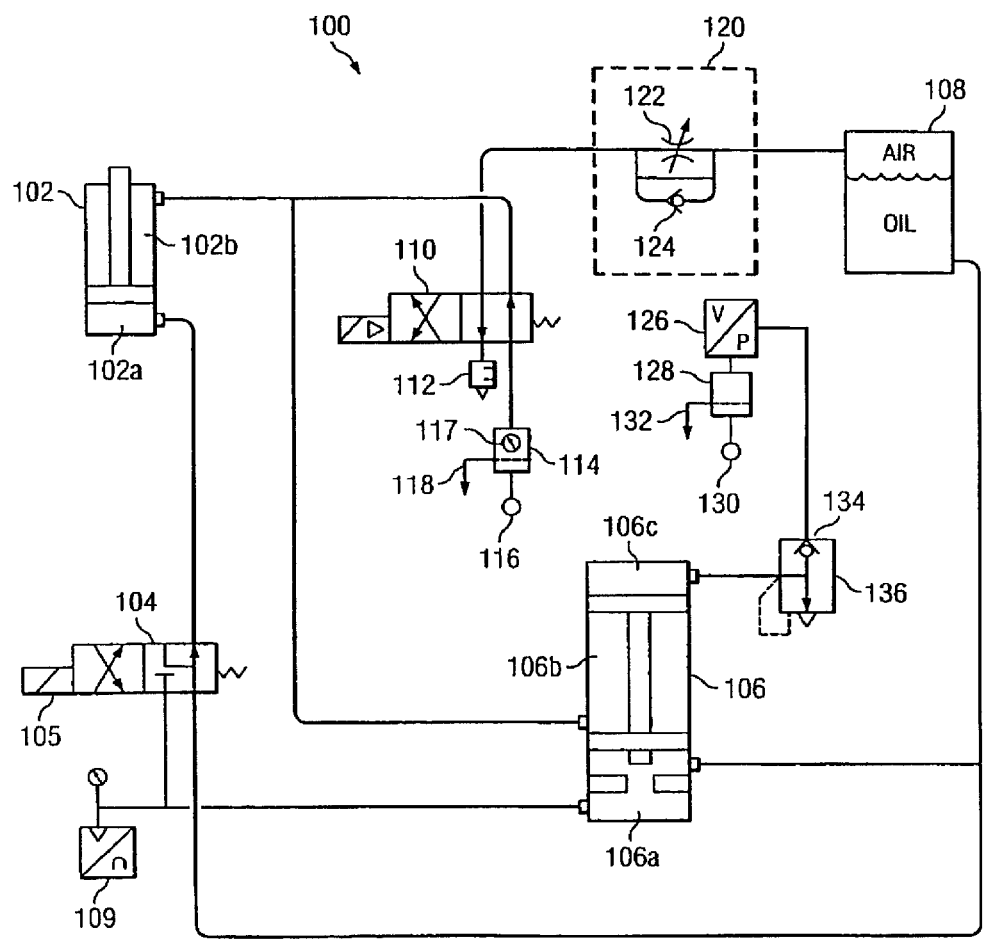
FIG. 6 is a schematic drawing of an exemplary air/hydraulic circuit used in conjunction with the example apparatus of FIG. 1.

Turning now to FIG. 6, there is illustrated an exemplary clamping device 16. The clamping device 16 may be any suitable assembly capable of providing a controlled force to the press die assembly 14. In this example, the clamping device 16 is an air and hydraulic circuit 100, capable of providing a powerful, controlled, and fast acting press force. As shown, the circuit 100 includes a work cylinder 102 having a work portion 102a, an exhaust portion 102b and a drive portion 102c. As best illustrated in FIG. 2, the drive portion 102c engages a half collar 104 at the bottom of the press die assembly 14 to operatively couple the circuit 100 with the press die assembly 14.

Returning to FIG. 6, the work portion 102a of the work cylinder 102 is coupled through a hydraulic valve 104 to a lower chamber 106a of a hydraulic booster 106, as well as an oil portion of an air/oil tank 108. The hydraulic booster 106 includes a lower chamber 106a, a middle chamber 106b, and an upper chamber 106c. In this embodiment, the hydraulic booster 106 provides approximately a 25.3:1 pressure ratio, and accordingly, a corresponding 100 lbs/in$^2$ pressure input may correspond to a pressure output of 2,530 lbs/in$^2$. The hydraulic valve 104 includes a solenoid 105 that in operation releases to quickly allow pressure built into the hydraulic booster 106 to be delivered to the work cylinder 102, thereby quickly driving the drive portion 102c of the work cylinder 102 upward to quickly provide the press die assembly 14 with a precise force. Monitoring the pressure in the lower chamber 106a of the hydraulic booster 106 is a pressure transducer 109. The pressure transducer 109 is operatively coupled to the hydraulic valve 105 to ensure the solenoid 105 does not release until the pressure in the system has achieved the proper desired setting.

The exhaust portion 102b of the work cylinder 102 is coupled to the middle chamber 106b of the hydraulic booster 106, as well as to an air valve 110. The air valve 110 includes a muffler 112 and an air filter regulator 114 having an air supply 116, a gauge 117, and a drain 118. The air valve 110 is coupled to an air portion of the air/oil tank 108 through a flow control device 120. The flow control device 120 includes an adjustable orifice 122 and a check valve or ball funnel 124. The adjustable orifice 122 controls the flow rate through the flow control device 120 in one direction, while the ball funnel 124 allows air to travel through the ball funnel in only one direction. Thus, in operation, the flow control device 120 forces air through the orifice 122 in one direction while allowing air to flow through both the orifice 122 and the ball funnel 124 in an opposite direction.

The pressure in the air/hydraulic circuit 100 is controlled by a proportional air valve 126. The proportional air valve 126 includes a filter regulator 128 having an air supply 130 and a drain 132. The proportional air valve 126 is coupled to the upper chamber 106c of the air hydraulic booster 106 through a ball funnel 134 located in a quick exhaust valve 136. The quick exhaust valve 136 may be utilized to quickly release the pressure within the circuit 100. To initiate a pressure in the circuit 100, the proportional air valve 126 receives a voltage (e.g., a control signal from the controller 20) and supplies a corresponding pressure to the upper chamber 106c. For example, the proportional air valve 126 may receive a voltage ranging from 0 to 10 volts, and output a corresponding 0 to 100 lbs/in$^2$. As described above, through the air hydraulic booster 106, the input pressure may be boosted at a 25.3:1 ratio, and therefore, a 5 volt input to the proportional air valve 126 may result in a 1,265 lbs/in$^2$ output pressure by the hydraulic booster 106 to the work cylinder 102. In this manner, the compression force utilized during the combustion synthesis bonding may be precisely delivered to the press die assembly 14.

Figure 7:
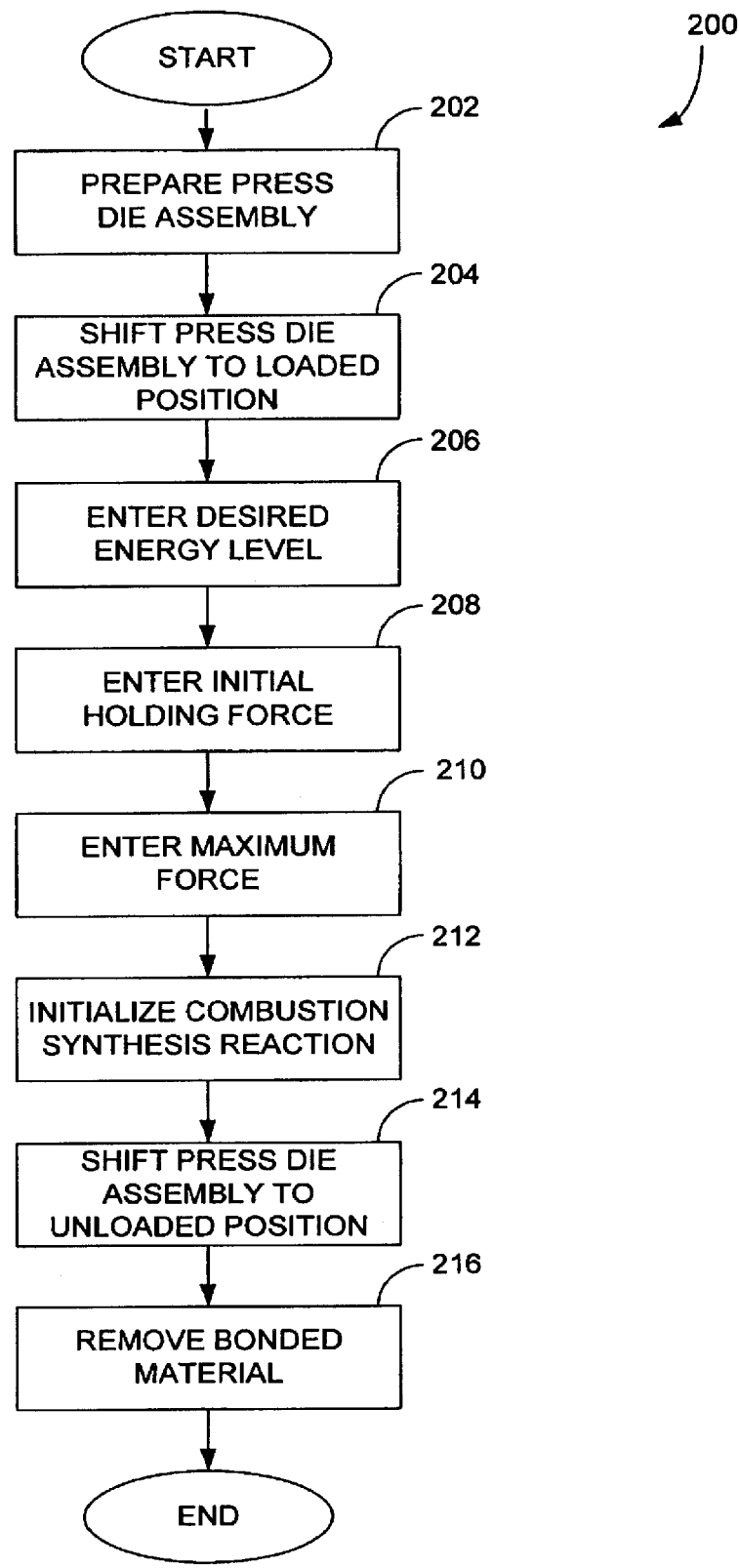
FIG. 7 is a flowchart of an exemplary method of bonding carbon-based composites through a reactant layer utilizing the apparatus of FIG. 1.

FIG. 7 illustrates a flowchart of one exemplary method of combustion synthesizing two carbon-based composites utilizing the press 10 and generally referred to by reference numeral 200. In particular, the press 10 may be utilized to bond at least two carbon-carbon composite friction materials by the initiation of combustion synthesis within a reactant layer. In this exemplary method 200, the press 10 is prepared for usage by the placement of at least the two carbon-carbon composite discs 86, 88 between the press plates 74, 78 of the press dies assembly 14 (block 202). A reactant layer 90 is placed between at least a portion of the surfaces of the discs 86, 88 to be bonded. In this example of the preparation of the press die assembly 14, the press 10 is moved to the unloaded position and is prepared with the first carbon-carbon composite disc 86 and the second carbon-carbon composite disc 88. As part of the preparation (block 202), the reactant layer 90, such as for instance, titanium and optionally carbon powder is placed between the two discs 86, 88. As disclosed above, the discs 86, 88 may be optionally wrapped in the thermal insulator 92, and still further may be optionally held by the retaining band 94. Additionally, a thermocouple may be positioned proximate the reactant layer 90 and operatively coupled to the controller 20 to monitor the temperature during the combustion synthesis process.

Once the assembly 14 is prepared, it is moved to the loaded position, where it is ready for processing (block 204). As noted previously, a limit switch, or other suitable detection device may be utilized to ensure the press die assembly 14 is properly seated in the operating position. Further, a safety switch (not shown) may be utilized to verify the proper closing of the protective guard 24 if such a guard is installed. At any time prior to or during the initiation of the combustion synthesis process, the controller 20 may be programmed for the execution of a desired manufacturing sequence. For example, the controller 20 may be programmed with a desired energy level for combustion synthesis (block 206) (e.g., a maximum current to correspond to a desired created temperature), a desired initial holding force (block 208), and a maximum desired loading force (block 210), including, for example, a delay time before the application of the loading force and the time of application of maximum loading force. It will be appreciated by one of ordinary skill in the art that the controller 20 may be any suitable programmable device, including for example, a programmable logic controller (PLC), a personal computer, or other suitable controller. In one example utilizing titanium and carbon powder as the reactant layer, the controller 20 may be programmed with an initial loading force of 500 lbs/in$^2$, a maximum loading force of 7400 lbs/in$^2$, a delay time of maximum force application of 1 second, a time of maximum force application of 10 seconds, a maximum current of 600 Amps, a time of current of 5 seconds, and an initial temperature of 30° C.

After the controller 20 is programmed, and the press die assembly 14 properly loaded, the combustion synthesis reaction may be initialized as programmed (block 212). In particular, the programmed holding force is applied to the press die assembly 14 and the proper pressure in the clamping device 16 is developed such that the work cylinder 102 can impart the programmed maximum force to the press die assembly 14. Once the proper pressure is developed, the power supply 22 and the work cylinder 102 are activated, and the combustion synthesis process is initiated and completed. For example, the electric potential developed across the plates 74, 78, and accordingly across the carbon discs 86, 88 and the reactant layer 90, is released to initiate a combustion reaction that creates a molten ceramic that in turn bonds the carbon-carbon composite discs 86, 88 with ceramic. In one example, utilizing the parameters noted above, the entire process may take approximately 10 seconds to complete. It will be appreciated by one of ordinary skill in the art that the order of execution of the combustion synthesis steps may be changed, and/or some of the steps described may be changed, eliminated, combined and/or subdivided into multiple steps. Finally, after the combustion synthesis reaction is completed, the press die assembly 14 may be shifted to the unloaded position (block 214) and the bonded material (i.e., the discs 86, 88) may be removed (block 216).

Although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents. Further, although the example processes are described with reference to the flowchart illustrated in FIG. 7, persons of ordinary skill in the art will readily appreciate that many other techniques for implementing the example methods and apparatus described herein may alternatively be used. For example, with reference to the flowchart illustrated in FIG. 7, the order of execution of the blocks may be changed, and/or some of the blocks described may be changed, eliminated, combined and/or subdivided into multiple blocks.

We claim:

1. A system comprising:
    a housing;
    a first conductive press plate coupled to the housing and being electrically insulated therefrom;
    a second conductive press plate supported by the housing opposite the first conductive press plate and being electrically insulated from the housing, wherein at least one of the first and second conductive press plates are translatable toward the opposite press plate, the first and second press plates being adapted to hold a carbon-carbon assembly between the first and second press plates, the carbon-carbon assembly comprising first and second carbon composites and a reactant layer between at least a portion of surfaces of the first and second carbon composites;
    a first die base, wherein the first conductive press plate is mounted to the first die base, dielectric material being positioned between the first conductive press plate and the first die base;
    a second die base, wherein the second conductive press plate is mounted to the second die base, dielectric material being positioned between the second conductive press plate and the second die base;
    a clamping device operatively coupled to at least one of the first and second conductive press plates, wherein the clamping device is configured to transmit a force to the first and second conductive press plates to compress the first and second carbon composites and the reactant layer between the press plates when the carbon-carbon assembly is positioned between the first and second press plates; and a power supply operatively coupled to the first and second conductive press plates and configured to create an electric potential across the first and second conductive press plates while the clamping device transmits the force to the first and second press plates, wherein the electric potential is configured to increase a temperature of the reactant layer when the carbon-carbon assembly is positioned between the first and second press plates.

2. The system of claim 1, further comprising a dielectric material interposed between at least one of the first or second conductive press plates and the housing to assist in electrically isolating the at least one of the first or second conductive press plates from the housing.

3. The system of claim 1, wherein the first and second press plates are removable from the clamping device.

4. The system of claim 1, further comprising a thermal insulator configured to surround at least a portion of an outer surface of at least one of the reactant layer or the first and second carbon composites when the carbon-carbon assembly is positioned between the first and second press plates.

5. The system of claim 1, further comprising a thermocouple configured to be located proximate the reactant layer when the carbon-carbon assembly is positioned between the first and second press plates, wherein the thermocouple is configured to monitor the temperature of the reactant layer.

6. The system of claim 1, wherein the clamping device comprises a hydraulic cylinder.

7. The system of claim 1, wherein the reactant layer comprises titanium and carbon powder and the electric potential is configured to increase a temperature of the titanium and carbon powder above a temperature required to initiate a combustion reaction that creates a molten ceramic that bonds the first and second carbon composites together.

8. The system of claim 1, wherein the clamping device is configured to press the reactant layer and the first and second carbon composites together under a force of 1265 lbs/in² to 2530 lbs/in².

9. The system of claim 1, wherein the first and second conductive press plates are each electrically insulated from the housing by a high current power supply insulator.

10. The system of claim 1, further comprising the carbon-carbon assembly comprising the first and second carbon composites and the reactant material between at least the portion of surfaces of the first and second carbon composites.

11. The system of claim 10, further comprising a retaining band surrounding at least a portion of an outer surface of at least one of the reactant layer or the first and second carbon composites.

12. The system of claim 10, further comprising a controller configured to:
control the clamping device to press the first and second carbon composites together under a force, with the reactant layer therebetween; and
control the power supply to create an electric potential across the reactant layer to initiate a combustion reaction and create a molten ceramic thereby bonding the first and second carbon composites together.

13. The system of claim 12, wherein the controller comprises a programmable logic controller.

14. The system of claim 10, wherein the reactant layer comprises a ceramic, and wherein the electric potential is configured to increase a temperature of the reactant layer above a temperature required to initiate a combustion reaction that creates a molten ceramic that bonds the first and second carbon composites together.

15. The system of claim 10, wherein at least one of the first or second carbon composites comprises a carbon brake disc part.

16. The system of claim 10, wherein the electric potential is configured to increase the temperature of the reactant layer above a temperature required to initiate a combustion synthesis reaction.

17. The system of claim 10, wherein the reactant material comprises titanium.

18. The system of claim 1, wherein the first and second press plates are adapted to hold a mold.

* * * * *